United States Patent [19]

Wooding

[11] 4,389,724
[45] * Jun. 21, 1983

[54] ATMOSPHERE CONTROLLED ELECTRIC MELTING

[75] Inventor: Patrick J. Wooding, Moorestown, N.J.

[73] Assignee: Wooding Corporation, Moorestown, N.J.

[ * ] Notice: The portion of the term of this patent subsequent to May 13, 1997, has been disclaimed.

[21] Appl. No.: 119,450

[22] Filed: Feb. 7, 1980

Related U.S. Application Data

[63] Continuation-in-part of Ser. No. 773,263, Mar. 1, 1977, Pat. No. 4,202,997.

[51] Int. Cl.³ .................................................. C03B 5/02
[52] U.S. Cl. ........................................ 373/33; 373/27; 373/45; 373/8
[58] Field of Search .................... 13/6, 9, 9 ES, 23, 31, 13/33, 35, 34; 373/27–30, 33, 42, 44, 45, 110, 118, 122

[56] References Cited

U.S. PATENT DOCUMENTS

| | | | |
|---|---|---|---|
| 1,963,481 | 6/1934 | Willcox | 13/35 |
| 1,965,080 | 7/1934 | Kemmer | 13/9 |
| 2,131,599 | 9/1938 | Shrum | 13/6 |
| 2,223,047 | 11/1940 | Ramseyer | 13/6 |
| 2,274,597 | 2/1942 | Gentil | 13/8 |
| 2,541,764 | 2/1951 | Herres et al. | 13/33 |
| 2,952,723 | 9/1960 | Garmy | 13/33 |
| 2,958,719 | 11/1960 | Beecher | 13/31 |
| 3,358,067 | 12/1967 | Dillon et al. | 13/23 |
| 3,385,494 | 5/1968 | Themelis et al. | 13/9 ES |
| 3,489,841 | 1/1970 | Cheng | 13/31 |
| 3,777,041 | 12/1973 | Hawkins | 13/9 ES |
| 3,973,076 | 8/1976 | Scott, Jr. et al. | 373/45 |
| 4,131,752 | 12/1978 | Wooding | 13/31 R |
| 4,202,997 | 5/1980 | Wooding | 13/31 R |

Primary Examiner—Bernard Roskoski
Attorney, Agent, or Firm—Duffield & Lehrer

[57] ABSTRACT

A substantially spherically-shaped electric melting furnace includes a carbon-lined crucible. The interior of said crucible is sealed from the atmosphere outside the crucible and a vacuum pump and venturi device control the atmosphere within the crucible by removing oxygen therefrom. A feeder lock allows material to be fed into the crucible without interfering with the atmospheric control of the crucible and a tap hole adjacent the lower portion of the crucible allows molten material to be removed. When used in the manufacture of mineral wool insulation, slag is fed into the crucible to be melted and the molten slag from the tap hole is delivered to a fiberizing device.

17 Claims, 3 Drawing Figures

ATMOSPHERE CONTROLLED ELECTRIC MELTING

CROSS-REFERENCE TO RELATED APPLICATION

This application is a continuation in part of co-pending application Ser. No. 773,263 filed Mar. 1, 1977 now U.S. Pat. No. 4,202,997.

BACKGROUND OF THE INVENTION

The present invention is directed toward an atmosphere controlled electric melting furnace for use on a variety of materials and more particularly for the melting of non-metallics in the production of mineral wool insulation.

Since the 1850's, mineral wool for thermal and acoustic insulation has been produced from a wide variety of raw materials, including blast furnace slags from copper, lead and iron production. To make mineral wool, these materials are remelted in fuel-fired cupola furnaces which are primitive devices offering little quality control, substantial air pollution and, in recent years, high operating cost because of the steep rise in the cost of coke, their principal fuel.

Careful and detailed studies of the reactions in large cupolas such as an iron blast furnace, decades of effort to establish optimum levels for all its parameters, and enormous increases in size (several recently commissioned units exceed 10,000 tons of iron per day, or 14,000 pounds per minute) have resulted in predictable quality and reasonable economy.

By contrast, the small cupola furnaces ($\approx 5$ tons per hour) in use all over the world to produce molten non-metallics to be fiberized into mineral wool are small and inefficient. No economies of scale have been achieved, because mineral wool is bulky, and cannot be transported over great distances without absorbing the margin in freight costs. Further, the "spinners" used by most operators to fiberize the molten stream of slag discharging from the cupola are generally limited to 5 tons per hour per set, in present practice, and mounted one set per furnace, or "line".

As a result, the typical cupola currently in service to melt non-metallics for mineral wool is a water-cooled steel shell 6 to 7 feet in diameter and 15 to 25 feet high. It is by nature thermally inefficient, air polluting and high in operating cost. The quantities of particulate matter, sulphur and sulphur oxides in the top discharge of fume from the cupola require prohibitively high capital and maintenance costs to control, considering that only 5 tons per hour are melted.

The cupola's most important deficiency is its lack of control of the quality of the product. Residence time, in a molten state, of each increment of charge is very small, of the order of seconds in some cases or minutes at most. Modification of tapping temperature can only satisfactorily be achieved by charge additions, such as sand, to lower the melting point. Increase in melt rate can only be achieved by increasing the blast, with a consequent change in residence time and tapping temperature.

The ability of the spinning system to convert most of the cupola discharge into high quality product is a function of the surface tension of the molten stream, which in turn is affected by temperature, chemistry and viscosity. The inability of the cupola to control these variables results in poor average performance. Sometimes, when optimum fiberizing conditions are approached, a cupola/spinner combination converts a much higher percentage of its molten feed into high quality product, indicating that even modest control of the key melting variables will give significant improvement in yield.

Surface tension is a critical parameter in the fiberization process. The breakdown of the slag film into fibers is illustrated in FIG. 1. The spinning wheel produces a plane sheet of liquid slag 10 which is hit at right angles by a high velocity stream of air. The slag film 10 is deflected and is subjected to aero-dynamic instabilities which develop into waves propagating with increased amplitude in more or less tangential orientation.

At the leading edge of the sheet, half or full wavelengths of the molten material are detached by the impact of the air blast 12 and contract into ligaments 14 under the influence of surface tension. What then happens to these ligaments, i.e. whether they are converted into useful fiber 16, or shot 18 to be rejected, depends largely upon the temperature-viscosity relationship.

Since raw materials, particularly iron blast furnace slags, are in abundance as (mostly) waste matter, and mineral wool of good quality has high value as insulation, a number of attempts have been made over the last 20 years to find a more satisfactory melting method. These attempts have generally been based upon the use of an electric furnace for resistance, arc or induction melting of the charge, with a view to providing molten material which is controlled in terms of flow rate, temperature and composition, at a competitive cost.

Each of these attempts has failed, not because electric melting of slags is in itself particularly difficult, but because its achievement in a controlled fashion with any conventional electric furnace has proved uneconomical.

The source energy used to melt a ton of blast furnace slag by means of a 5 ton per hour cupola may be shown to be about 7 million BTUs. Because of lack of control of the temperature, chemistry and rate of the cupola discharge, an average of 45 percent of this melted material is wasted as shot and tailings, so the source energy required for the melting of 1 ton of product is approximately 12.5 million BTUs.

By contrast, under ideal conditions, the total heat required to raise 1 ton of iron blast furnace slag to tapping temperature is approximately 450 KWH, or 1.5 million BTUs. However, since the efficiency of a modern thermal power station is 37 percent at best, and transmission losses to the melting site will probably account for another 10 percent, the total source energy requirement to raise 1 ton of slag to tapping temperature is, under ideal conditions, 4.5 million BTUs. And therefore, in conventional 5 ton per hour electric furnace of 70 percent overall thermal efficiency, source energy required is 6.4 million BTUs per ton melted. Assuming that the improvement in control of tapping temperature, chemistry and rate due to conventional electric melting provides an increase in useful mineral wool product from the present 55 percent to 65 percent, the net source energy requirement for this electric melter is 9.8 million BTUs per ton of product.

In summary, the source energy required per ton of mineral wool product is approximately 20 percent more for current cupola practice than it is for conventional electric melting.

Expressed in economic terms, at $170 per ton of coke, and an average power cost in the United States of $0.028 per KWH (in 1979), the savings in energy cost indicated for conventional electric melting over cupola melting are approximately $10 per ton melted, or $18 per ton of product.

Unfortunately, these savings in energy cost are offset by the high cost of refractories in the conventional electric furnace, because molten slag and the presence of available oxygen will erode all known refractory lining systems, even carbon and graphite. Carbonaceous materials oxidize, or burn away increasingly rapidly as their temperatures rise above 900 degrees F. For example, industrial graphite loses 6 percent of its weight by oxidation when maintained at 1,100 degrees F in air for only two and a half hours. The melting point of iron blast furnace slag, depending upon composition, is 2,500 to 2,800 degrees F.

SUMMARY AND ADVANTAGES OF THE INVENTION

The present invention overcomes the above-described problems with the prior art systems. This is accomplished by constructing an electric melting furnace equipped for high integrity atmosphere control, thereby excluding atmospheric oxygen and permitting the use of carbonaceous materials as an economical refractory lining.

This fully enclosed furnace lends itself to thermal insulation of a very high order, permitting thermal efficiencies of 80 to 85 percent for a 5 ton furnace, with corresponding reductions in source energy requirements and operating cost.

The quantity of fume generated by a totally enclosed furnace, from which atmospheric air is excluded, is a small fraction of that resulting from the thousands of cubic feet of counterflow air blast needed for cupola operation. Consequently, fume handling for the new furnace is reduced to modest, relatively inexpensive proportions.

Charge increments are delivered through an atmosphere lock into a molten pool constituting approximately 1 hour of production. The resulting 30 to 60 minute residence time, in conjunction with fully variable energy input and charge and discharge rates, and controlled atmosphere, make the furnace inherently capable of very close control of tap temperature, chemistry and rate, permitting predictable surface tension and viscosity, and corresponding improvements in product quality and yield.

The new furnace also accepts and recycles the rejected shot and tailings which cannot be utilized by the cupola, thereby permitting significant savings in raw material and waste handling costs.

The cumulative effect of the foregoing advantages are substantial savings in source energy and operating cost. With reasonable refractory life, a furnace efficiency of 85 percent, a spinner yield of 75 percent and full recycling of shot and tailings, the source energy required per ton of product drops from 12.5 million BTUs in the cupola to 7 million per BTUs, and operating cost drops by more than $40 per ton of product, using 1979 figures.

The furnace of this invention is capable of melting a wide range of materials, from non-metallics to metallics, providing a suitable working lining is chosen, and of employing a wide range of melting modes, including AC or DC, single or multiple electrodes, arc, submerged arc, resistance or induction.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
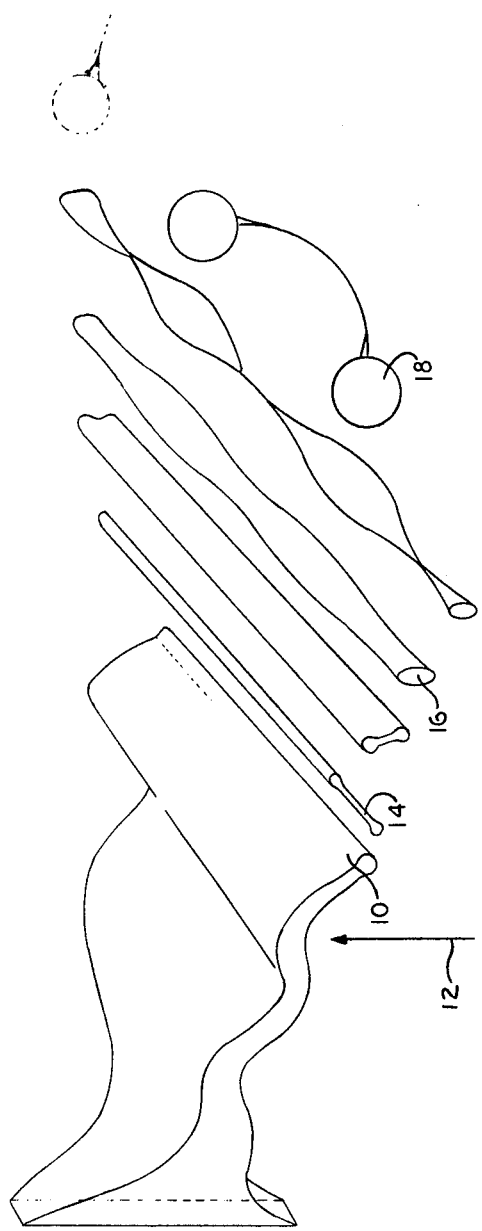
FIG. 1 is an illustration of the manner in which slag film is broken down into fibers as explained above.
Figure 2:
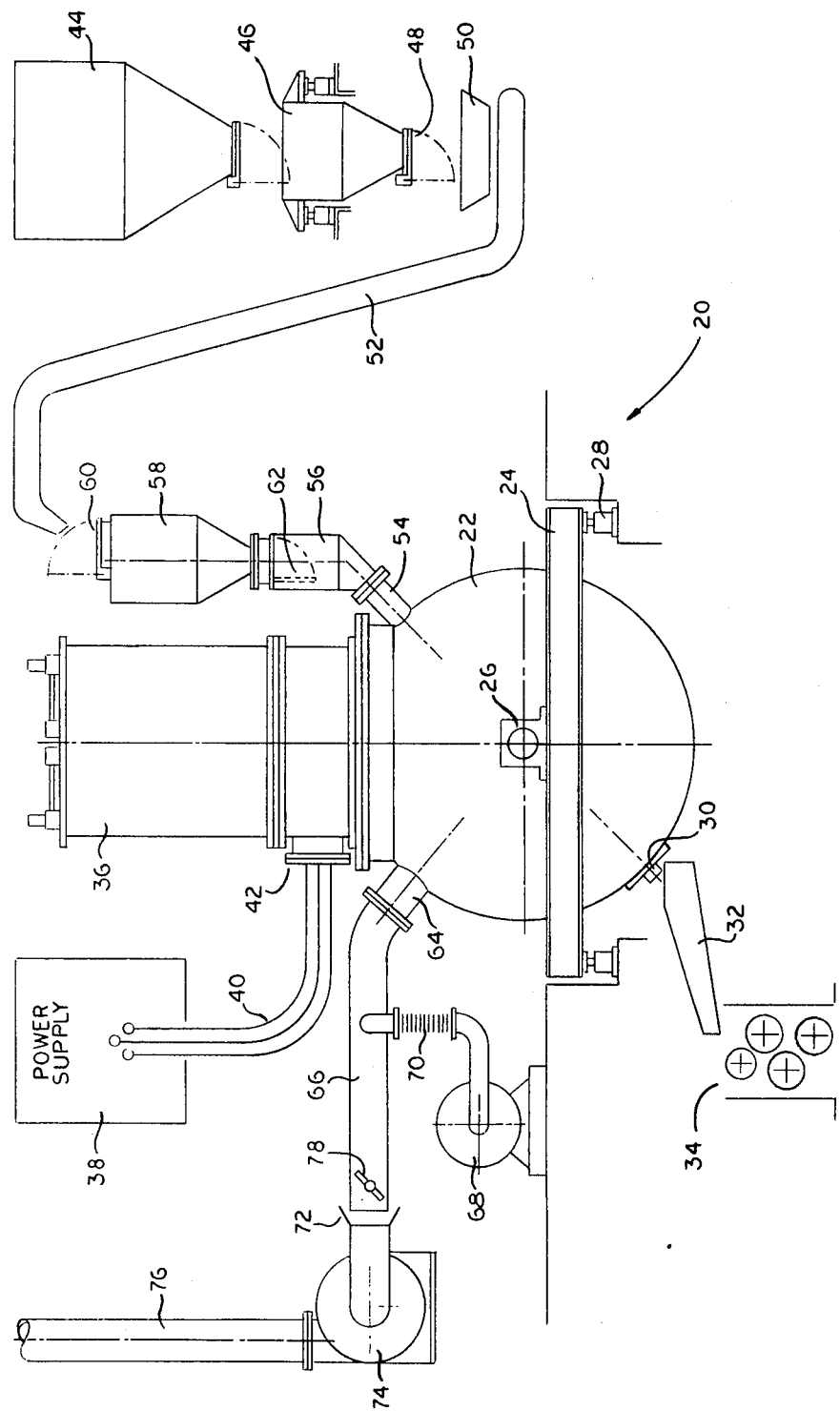
FIG. 2 is an elevational view of an atmosphere controlled electric melting furnace system constructed in accordance with the principles of the present invention.

Referring now to the drawings in detail wherein like reference numerals have been used throughout the figures to designate like elements, there is shown in FIG. 2 a general elevational view of an atmosphere controlled electric melting furnace system constructed in accordance with the principles of the present invention and designated generally as 20.

System 20 includes an electric melting furnace 22, the details of which will be described in more particularity with reference to FIG. 3. Furnace 22 is mounted on a support frame 24 by the use of tilting trunnions 26. A plurality of load cells are mounted beneath the support frame 24 so that the weight of the furnace 22 and other associated structures can be measured. This, of course, makes it possible to then determine the weight of the material within the furnace by subtracting the tare weight from the total weight measured.

Located in the lower portion of the furnace 22 is a tap hole 30 which, when desired, may be used to allow the molten material within the furnace to be removed therefrom. Beneath the tap hole 30 is a trough 32 which delivers the molten material to a four-wheel spinner 34. The molten material (slag in the embodiment presently being described) is then converted into mineral wool insulation using known techniques such as described hereinabove. Obviously, if materials other than slag are being melted in the furnace or if it is desired to make products other than mineral wool insulation, trough 32 and spinner 34 may be eliminated and replaced with other desired devices.

Located above the furnace 22 is an electrode suspension system 36. As will be explained more fully hereinafter, the electrode suspension system 36 not only supports the electrodes which may be used for melting the material within the furnace 22 but also functions as a cover member for sealing the interior of the furnace 22 from the outside atmosphere. Electrical power from the power supply 38 is delivered to the electrodes within the electrode suspension system 36 by flexible leads 40 which pass through a sealed power port 42 in the side of the electrode suspension system 36.

Material to be fed to the furnace 22 for melting is stored in one or more hoppers 44. When more than one hopper 44 is employed, differently materials may be stored in different hoppers. Each hopper 44 includes a weighing hopper 46 mounted beneath the same so that the exact quantities of each of the different materials desired to be fed to the furnace may be measured.

When the proper quantities of the desired materials are located in the weighing hoppers 46, gate 48 at the bottom thereof is opened and the material is deposited on a first conveyor 50. The material on conveyor 50 is then transferred to a second conveyor 52 which carries the material upwardly to the top of the furnace 22.

Material is fed into the interior of the furnace 22 through an inlet 54 and hopper 56 connected thereto. However, when feeding material into the furnace 22, and particularly when the furnace is being operated in a continuous mode rather than in a batch mode, it is essential to prevent atmospheric gases from entering the furnace through the inlet port 54.

This is achieved by a feeder lock 58 having a valve 60 at the top thereof and a valve 62 adjacent the bottom. With valve 62 closed, thereby sealing the inlet to the furnace 22, valve 60 is opened and the material is fed into the feeder lock 58. Valve 60 is then closed and the interior of the feeder lock is then purged with an inert gas such as nitrogen. Other inert gases could also be used and it is also possible to attach a source of vacuum to the feeder lock for merely withdrawing the atmospheric gases from the interior thereof. When this is accomplished, the lower valve 62 is opened and the material from within the feeder lock 58 enters the furnace 22 through the hopper 56 and inlet port 54.

Also located adjacent the upper portion of the furnace 22 is an exhaust port 64. Exhaust port 64 communicates with the interior of the furnace 22 and is connected to a horizontally extending exhaust manifold 66. A vacuum pump 68 is connected to the midpoint of the manifold 66 by way of a flexible hole 70. Located adjacent the free end of the manifold 66 is an adjustable venturi 72 powered by a fan 74, connected to chimney 76.

During start-up of the furnace 22, it is desired to substantially totally eliminate detrimental gases in the atmosphere within the furnace. This is accomplished by closing valve 78 at the free end of the exhaust manifold 66 and then running vacuum pump 68 until the pressure within the furnace 22 is reduced to the desired level. Thereafter, the vacuum pump 68 is turned off and the furnace is back-filled with inert gas such as nitrogen to slightly above atmospheric pressure. Once the furnace is running, valve 78 may be opened and fan 74 energized. The venturi 72 is then adjusted so that fumes may be removed from the interior of the furnace 22 but oxygen and other detrimental atmospheric gases will not be allowed to reenter. Utilizing the venturi 72, small quantities of make-up nitrogen and, in some circumstances, the vacuum pump 68, the atmosphere within the furnace 22 can be closely controlled.

Figure 3:
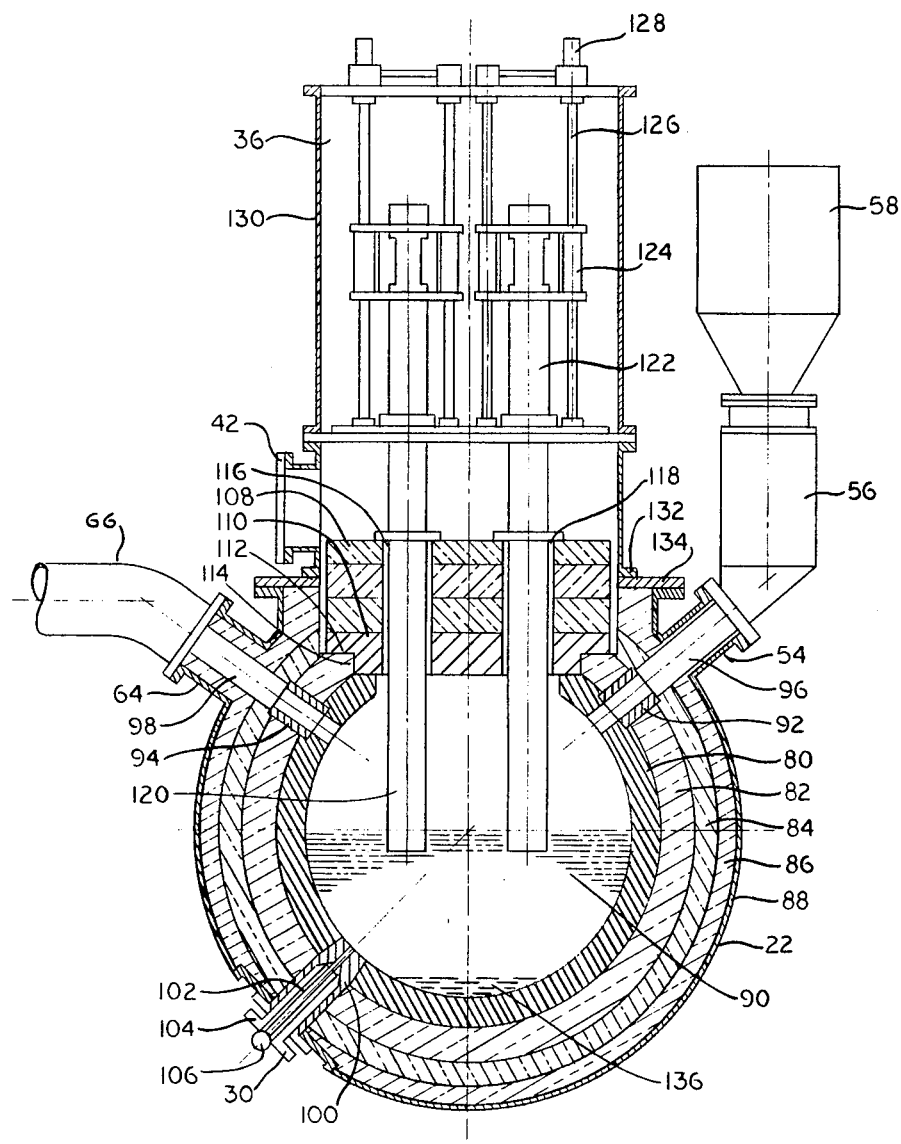
FIG. 3 is a cross-sectional view of the furnace shown in FIG. 2.

With specific reference now to FIG. 3, it can be seen that the furnace 22 is substantially spherically shaped and includes a substantially spherically-shaped refractory lining 80 which for slag melting is preferably comprised of carbon. Behind the carbon liner 80 is a backup lining 82 preferably comprised of high alumina refractory. This is followed by a refractory insulation 84 and a further insulation layer 86 preferably comprised of a material such as bubble alumina. The outer layer of the furnace 22 which covers the insulation layer 86 is a steel shell 88.

Molten material such as slag in the preferred embodiment is shown at 90 approximately half filling the crucible within the furnace 22. Because of the extremely high temperatures involved, it is important that the molten material 90 never "sees" any material which cannot withstand these temperatures. For this reason, the inner portion of the inlet port 54 includes a carbon tube 92 and a similar carbon tube 94 is located at the inner end of the exhaust port 64. Behind the carbon tubes 92 and 94 are water-cooled steel tubes 96 and 98, respectively. Similarly, the tap hole 30 is provided with a graphite tube 100 and a plurality of water-cooled steel members 102 and 104 adjacent the graphite tube 100. A plug 106 closes the end of the tap hole 30.

The crucible portion of the furnace 22 has an opening at the uppermost portion thereof. This opening is closed by a multilayer cover member 108. The lowermost layer 110 of the cover 108 is preferably comprised of carbon and has a stepped cross-section 112 so as to mate with the stepped portion 114 at the upper end of the crucible. The remaining layers of the cover member 108 above the graphite layer 110 are preferably comprised of the same materials as described with respect to the walls of the crucible of the furnace 22.

The cover member 108 has a plurality of holes 116 and 118 therein. These holes accommodate the electrodes 120 and 122 which are preferably comprised of graphite. Since at least one layer of the cover member 108 is comprised of an electrically conductive material, an annular space must be left between each electrode and the wall of the hole through which it passes.

The uppermost end of each of the electrodes is connected to a crosshead such as crosshead 124. The crossheads are, in turn, supported by a plurality of ball screws 126 which, when turned by drive motor 128, move the crosshead and therefore the electrodes up or down as desired. Power may be supplied to the electrodes 120 and 122 by flexible cables, sliding contacts or any other known technique.

While the cover member 108 closes the top of the furnace 122, it does not, by itself, create a totally airtight seal. This is provided by a steel shell 130 which totally surrounds and forms a part of the electrode suspension system 36. The lowermost portion of the shell 130 includes a flange 132 which cooperates with a flange 134 at the upper end of the shell 88 of the furnace 22. These flanges and other frame portions of the furnace system which may be subjected to excessive heats are preferably water cooled.

As is known in the art, when slag is melted, iron (or other metals in slag) is reduced and since it is heavier than the molten slag collects at the bottom of the furnace such as shown at 136. Because of the design of the present furnace, whenever it is desired to remove the molten metal 136, the entire furnace may be tilted several degrees counterclockwise as viewed in FIG. 3 about the tilting trunnions 26. In this position, the molten metal 136 may be tapped through the tap hole 30 or through a separate tap hole provided for the purpose.

While two electrodes 120 and 122 are illustrated in FIG. 3, it should be understood that this was by way of illustration only. It is also possible to utilize three electrodes in a multiphase system or a single electrode and to then utilize the carbon liner 80 as an additional electrode. Furthermore, AC or DC current may be employed and the melting mode may be by arc, submerged arc or resistance. Even further, it is possible to practice the present invention utilizing induction melting.

The present invention may be embodied in other specific forms without departing from the spirit or essential attributes thereof and accordingly, reference should be made to the appended claims rather than to the foregoing specification as indicating the scope of the invention.

I claim:

1. An electric melting furnace comprising:
   a carbon-lined crucible having an upper portion and a lower portion;
   means for sealing the interior of said crucible from the atmosphere outside said crucible, said means for sealing including a refractory-lined roof covering said upper portion;
   means for controlling the atmosphere within said crucible including means for removing detrimental gases detrimental to the lining therefrom;
   means for feeding non-metallic material to be melted into the interior of said crucible including means for preventing atmospheric gases from entering the interior of said crucible while said material is being fed thereto;
   electric means for melting the material fed into the crucible, and
   taphole means located adjacent the lower portion of said crucible for removing molten material from said crucible while said electric means is melting material within said crucible.

2. A furnace as claimed in claim 1 wherein said crucible is substantially spherically shaped.

3. A furnace as claimed in claim 1 wherein said electric means includes at least one electrode extending into the interior of said crucible.

4. A furnace as claimed in claim 3 wherein said electrode is comprised of carbon.

5. A furnace as claimed in claim 1 wherein said means for controlling the atmosphere includes means for removing oxygen therefrom.

6. A furnace as claimed in claim 1 wherein said refractory-lined roof is carbon-lined.

7. A method of electrically melting non-metallic material comprising placing said material in a carbon-lined crucible; controlling the atmosphere within said crucible by removing detrimental gases to the lining therefrom; electrically heating said material until it has melted while continuing to control the atmosphere and removing molten material from said crucible from an opening adjacent the lower portion thereof while continuously heating the material and controlling the atmosphere.

8. The method of claim 7 wherein said detrimental gases includes oxygen.

9. The method of claim 7 wherein the step of controlling the atmosphere includes replacing the atmosphere within the crucible with an inert gas.

10. The method of claim 9 wherein the atmosphere within the crucible is first evacuated before the crucible is filled with an inert gas.

11. The method of claim 7 further including the step of preventing atmospheric gases from entering the interior of said crucible when placing said material therein.

12. The method of claim 7 wherein said material is comprised of slag.

13. The method of claim 7 wherein the step of electrically heating includes heating the material with the use of at least one carbon electrode extending into the interior of said crucible.

14. The method of claim 13 wherein the step of electrically heating including heating said material by passing an electric current therethrough.

15. A method of making mineral wool fibers comprising placing non-metallic material in a carbon-lined crucible; controlling the atmosphere within said crucible by removing detrimental gases to the lining therefrom; electrically heating said material until it has melted while continuing to control the atmosphere; removing molten material from said crucible from an opening adjacent the lower portion thereof while continuously heating the material and controlling the atmosphere and converting said removed molten material into mineral wool fibers.

16. The method of claim 15 wherein the step of electrically heating includes heating the material with the use of at least one carbon electrode extending into the interior of said crucible.

17. The method of claim 16 wherein the step of electrically heating includes heating said material by passing an electric current therethrough.

* * * * *